US010769390B2

(12) United States Patent
Shiga et al.

(10) Patent No.: US 10,769,390 B2
(45) Date of Patent: Sep. 8, 2020

(54) POSITION BASED IDENTIFIER COMBINATION INFORMATION PROCESSING SYSTEM, UNIT, AND METHOD

(71) Applicant: Sony Corporation, Tokyo (JP)

(72) Inventors: Fumiko Shiga, Tokyo (JP); Soichi Fukasawa, Saitama (JP); Naoko Ishiduka, Kanagawa (JP); Akira Tange, Tokyo (JP); Tomomasa Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/781,360

(22) PCT Filed: Nov. 30, 2016

(86) PCT No.: PCT/JP2016/085491
§ 371 (c)(1),
(2) Date: Jun. 4, 2018

(87) PCT Pub. No.: WO2017/098974
PCT Pub. Date: Jun. 15, 2017

(65) Prior Publication Data
US 2018/0365456 A1     Dec. 20, 2018

(30) Foreign Application Priority Data
Dec. 8, 2015   (JP) .................. 2015-239486

(51) Int. Cl.
*G06K 7/10*     (2006.01)
*G06F 3/01*     (2006.01)
(Continued)

(52) U.S. Cl.
CPC ........ *G06K 7/10366* (2013.01); *G06F 3/014* (2013.01); *G06F 3/017* (2013.01); *G06K 19/07773* (2013.01); *G06Q 20/32* (2013.01)

(58) Field of Classification Search
CPC ........ G06F 3/014; G06F 3/01; G06K 7/10366
(Continued)

(56) References Cited

U.S. PATENT DOCUMENTS 5,670,987 A * 9/1997 Doi .................... B25J 9/1692
                                                345/156
6,515,669 B1 * 2/2003 Mohri .................. G06F 3/014
                                                345/418
(Continued)

FOREIGN PATENT DOCUMENTS

JP     2002-132446 A     5/2002
JP     2006-092376 A     4/2006
(Continued)

OTHER PUBLICATIONS

International Search Report and Written Opinion issued in connection with International Patent Application No. PCT/JP2016/085491, dated Feb. 7, 2017. (10 pages).

*Primary Examiner* — Toan C Ly
(74) *Attorney, Agent, or Firm* — K&L Gates LLP

(57) ABSTRACT

An information processing system according to an embodiment of the technology includes: a plurality of first wireless communication units each having an identifier; and a second wireless communication unit that reads out the identifier from each of the plurality of first wireless communication units combined from among the plurality of first wireless communication units. The information processing system further includes an information processing unit that executes
(Continued)

processing based on a combination of the plurality of identifiers that are read out by the second wireless communication unit.

18 Claims, 8 Drawing Sheets

(51) Int. Cl.
*G06Q 20/32* (2012.01)
*G06K 19/077* (2006.01)

(58) Field of Classification Search
USPC .......................................................... 235/492
See application file for complete search history.

(56) References Cited

U.S. PATENT DOCUMENTS

| | | | |
|---|---|---|---|
| 2002/0113778 A1 | 8/2002 | Rekimoto et al. | |
| 2007/0288104 A1 | 12/2007 | Yamauchi et al. | |
| 2008/0136775 A1* | 6/2008 | Conant | G06F 3/014 |
| | | | 345/156 |
| 2015/0357948 A1* | 12/2015 | Goldstein | G05D 7/0676 |
| | | | 318/16 |
| 2016/0048205 A1* | 2/2016 | Baier | G06F 3/014 |
| | | | 345/156 |
| 2017/0296363 A1* | 10/2017 | Yetkin | A61F 2/72 |
| 2018/0165566 A1* | 6/2018 | Rogers | G06K 19/0716 |

FOREIGN PATENT DOCUMENTS

| | | |
|---|---|---|
| JP | 2006-293942 A | 10/2006 |
| JP | 2010-246160 A | 10/2010 |
| JP | 2010-277488 A | 12/2010 |
| JP | 2014-174790 A | 9/2014 |

* cited by examiner

[FIG. 1]
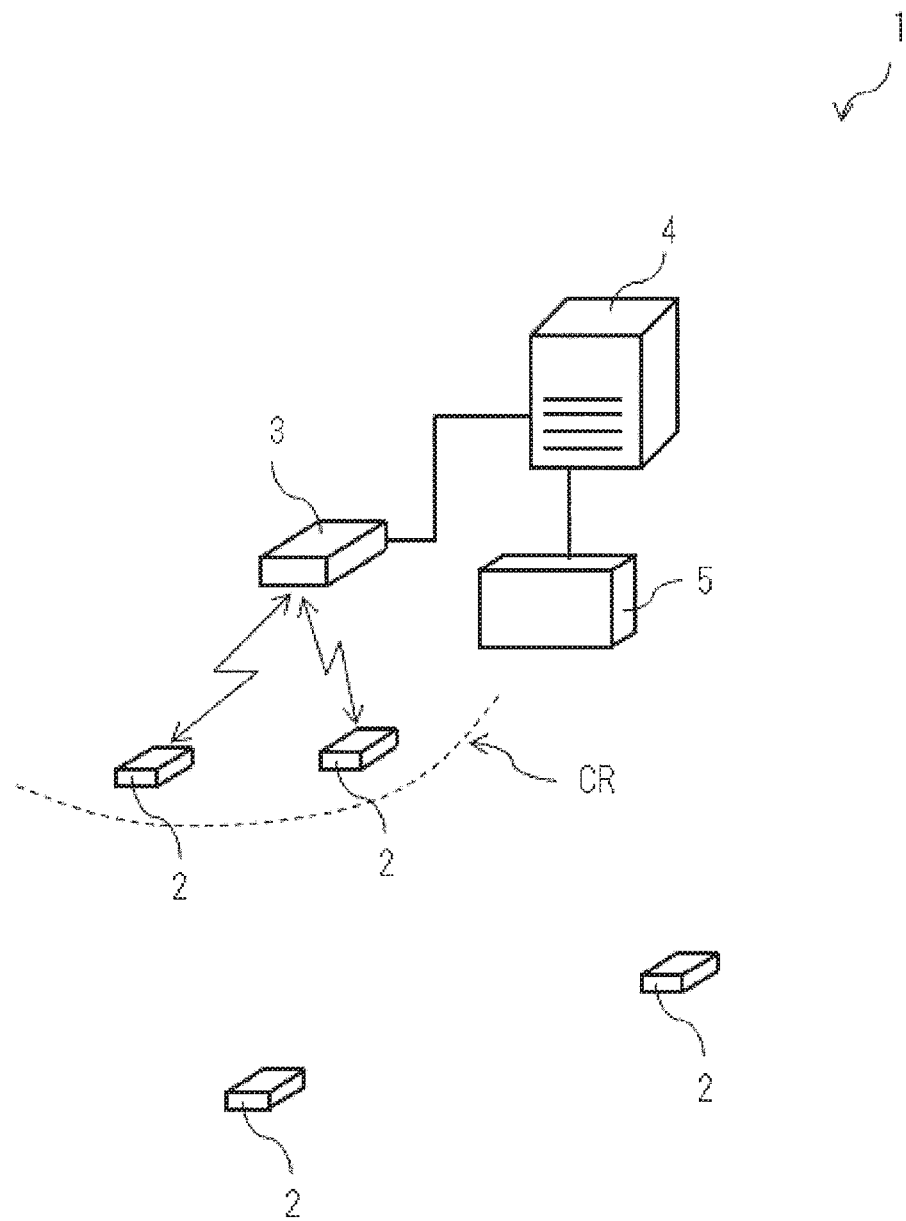

[FIG. 2]
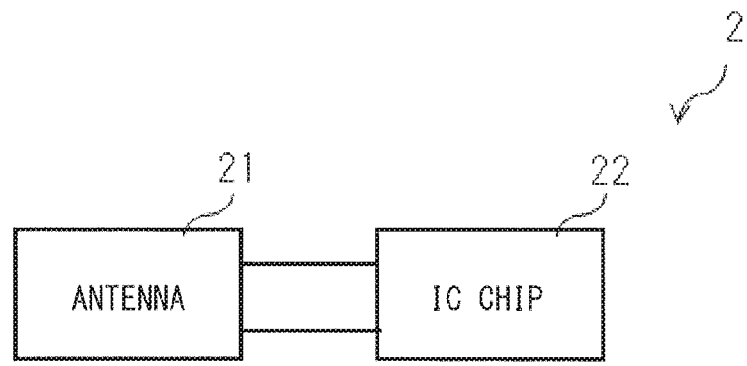
[FIG. 3]
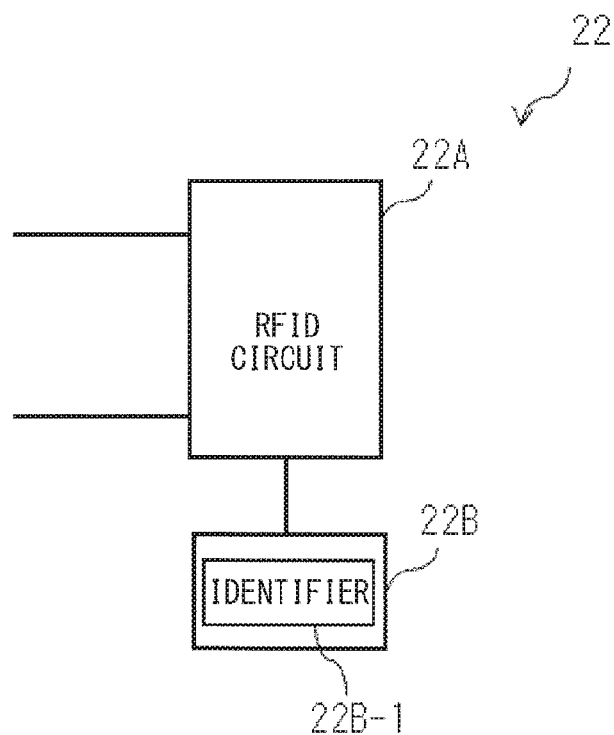

[ FIG. 4 ]
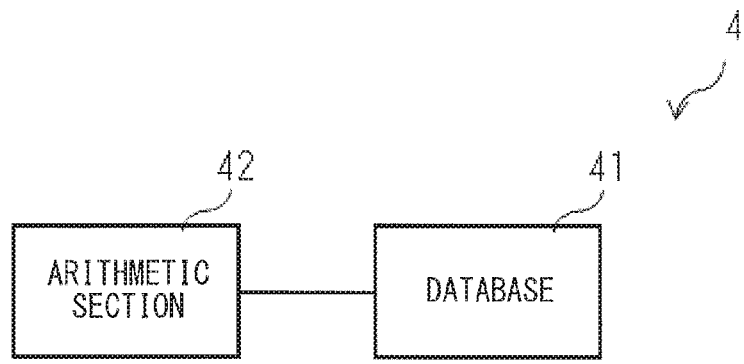
[ FIG. 5 ]
| IDENTIFIERS | CONTENTS OF PROCESSING |
|---|---|
| A AND B | PROCESSING OF ELECTRONIC MONEY SETTLEMENT |
| A AND C | PROCESSING OF ACCESS CONTROL |
| A AND D | PROCESSING OF GPS-BASED POSITIONAL MEASUREMENT |
[ FIG. 6 ]
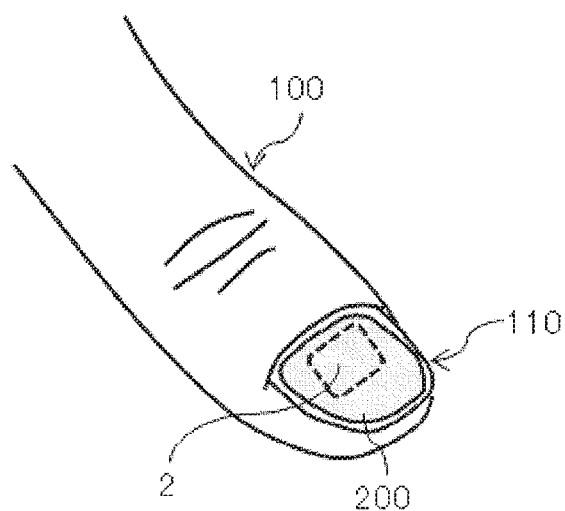

[ FIG. 7 ]
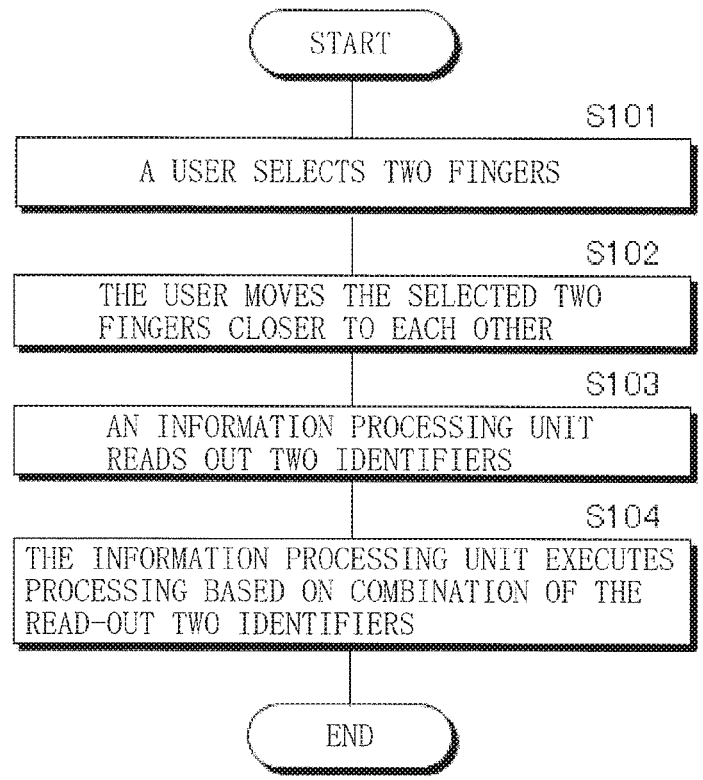
[ FIG. 8 ]
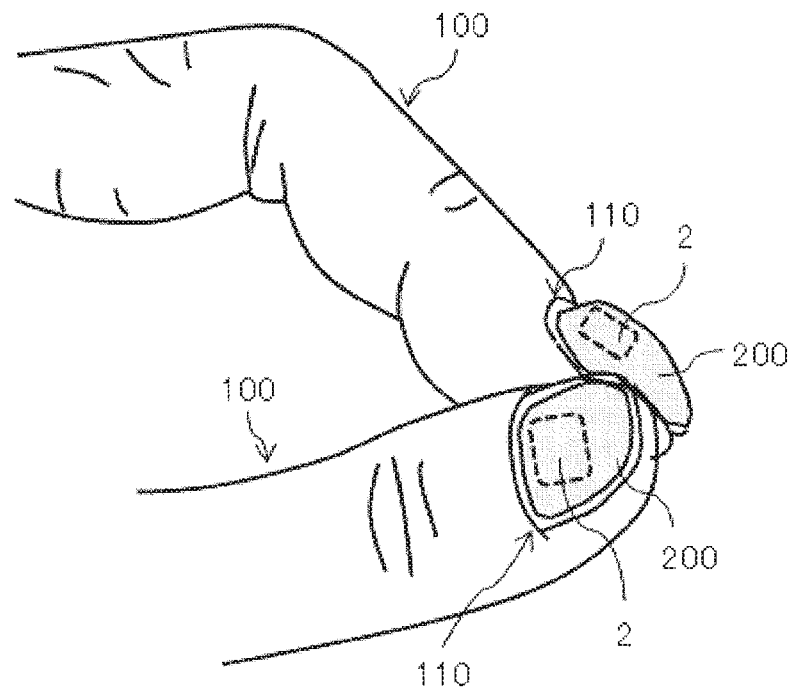

[ FIG. 9 ]
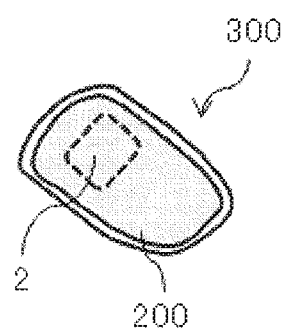
[ FIG. 10 ]

[ FIG. 11 ]
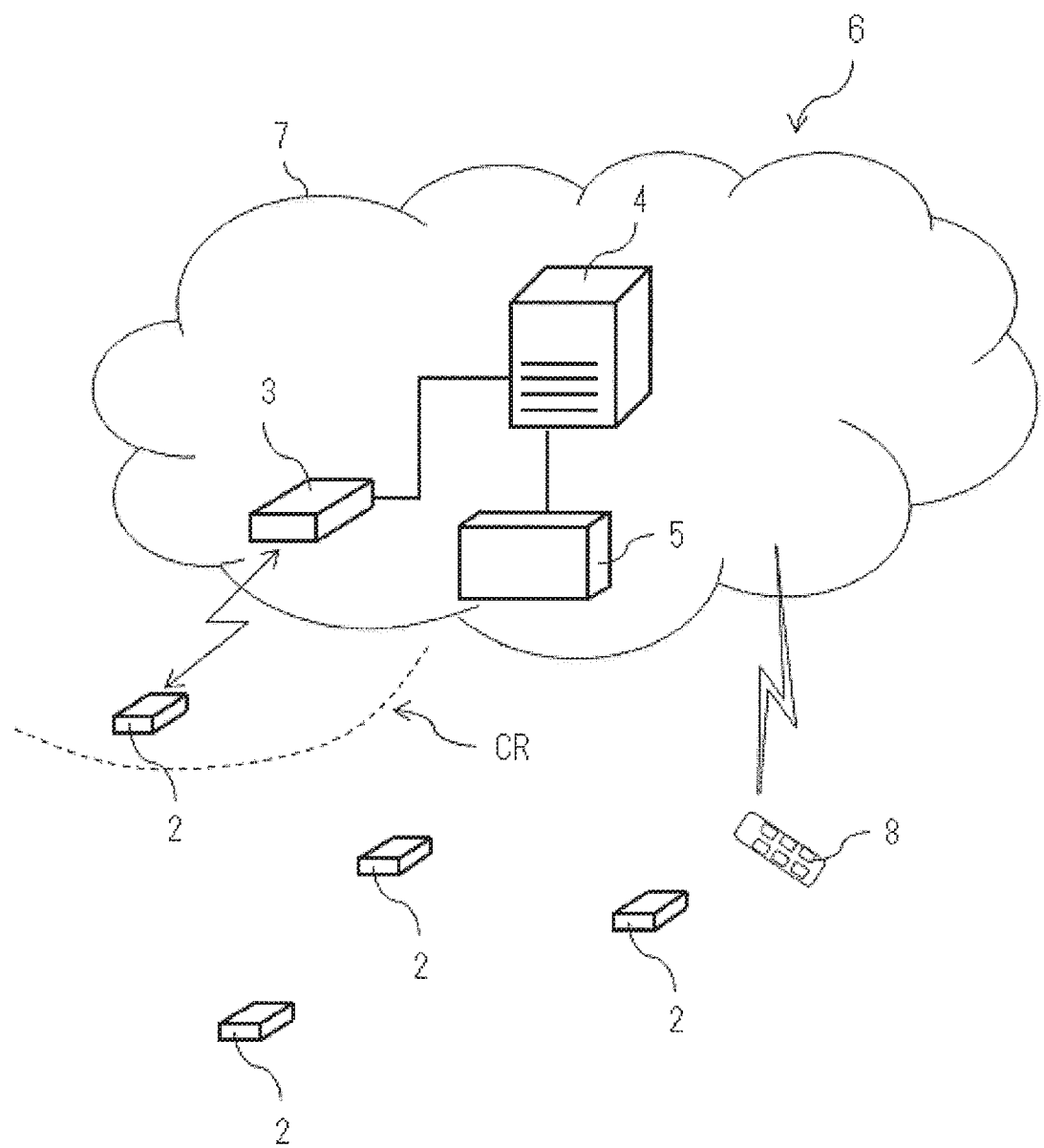

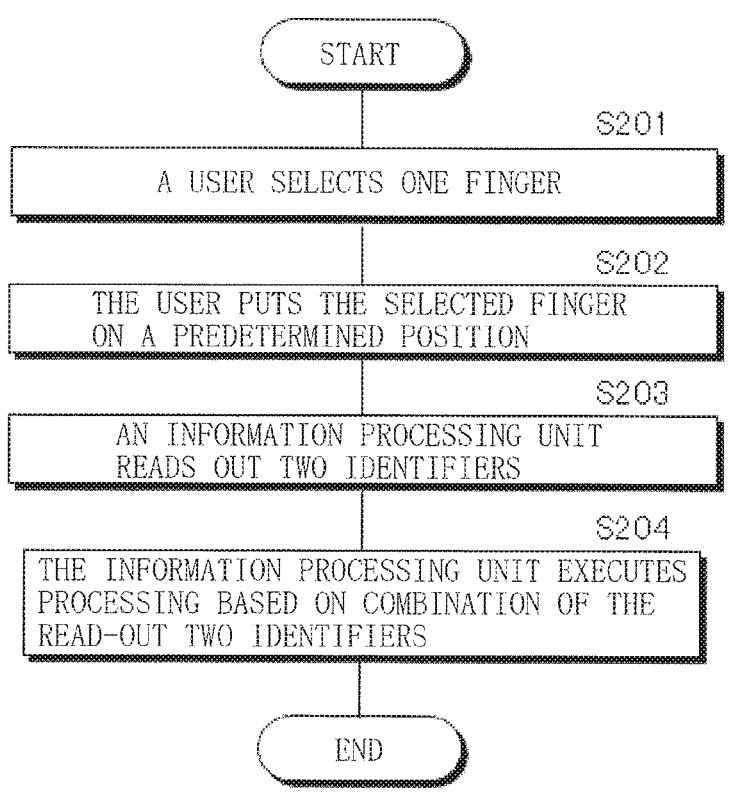

[ FIG. 14 ]

| IDENTIFIERS | CONTENTS OF PROCESSING |
|---|---|
| X, Y, AND α | PROCESSING OF CREDIT SETTLEMENT |
| X, Y, AND β | PROCESSING OF ELECTRONIC MONEY SETTLEMENT |

41

POSITION BASED IDENTIFIER COMBINATION INFORMATION PROCESSING SYSTEM, UNIT, AND METHOD

CROSS-REFERENCE TO RELATED APPLICATIONS

The present application claims the benefit of International Application No. PCT/JP2016/085491, filed Nov. 30, 2016, which claims priority to Japanese Application No. 2015-239486, filed Dec. 8, 2015, the disclosures of which are incorporated herein by reference.

BACKGROUND

The technology relates to an information processing system, an information processing unit, and an information processing method.

In recent years, a mobile apparatus such as a mobile phone or a smartphone, and an IC (Integrated Circuit) card have incorporated wireless communication units each with a built-in RFID (Radio Frequency Identification) circuit. Such a wireless communication unit has been used in, for example, electronic money settlement, access control, GPS (Global Positioning System)-based positional measurement, etc.

SUMMARY

In going out, a person may sometimes leave behind a mobile apparatus or an IC card inadvertently at home. In this case, the person is unable to receive a variety of services with use of a wireless communication unit when going out. Further, even if the person goes out without failing to carry the mobile apparatus or the IC card, it is necessary to take out the mobile apparatus or the IC card from a bag, etc. in order to receive a variety of services with use of the wireless communication unit.

To address this, for example, it is considered to fix the wireless communication unit onto a finger. In such a case, it is possible to prevent inadvertent forgetfulness, and further it is unnecessary to take out the mobile apparatus or the IC card from a bag, etc. In such a case, however, the finger may move into a communication region of a reader/writer, resulting in execution of wireless communication processing against a user's intent. Further, a similar issue is likely to occur also in the mobile apparatus or the IC card.

It is therefore desirable to provide an information processing system, an information processing unit, and an information processing method that make it possible to suppress generation of the wireless communication processing against a user's intent.

An information processing system according to a first embodiment of the technology includes: a plurality of first wireless communication units each having an identifier; and a second wireless communication unit that reads out the identifier from each of the plurality of first wireless communication units combined from among the plurality of first wireless communication units. The information processing system further includes an information processing unit that executes processing based on a combination of the plurality of identifiers that are read out by the second wireless communication unit.

An information processing unit according to the first embodiment of the technology includes a database that gives a description of contents of processing in accordance with a combination of a plurality of identifiers assigned one by one to each of a plurality of wireless communication units. The information processing unit further includes an arithmetic section that, when the plurality of identifiers that are combined are inputted, reads out, from the database, a content of processing in accordance with a combination of a plurality of identifiers that are inputted, and executes processing in accordance with the content of processing.

An information processing method according to the first embodiment of the technology is carried out when a third wireless communication unit having a first identifier is fixed onto a first finger directly or indirectly, and a fourth wireless communication unit having a second identifier is fixed onto a second finger directly or indirectly. The information processing method includes two steps given below:

(A) Reading out the first identifier and the second identifier with use of a fifth wireless communication unit when the third wireless communication unit and the fourth wireless communication unit, and the fifth wireless communication unit become able to communicate with each other as a result of the first finger and the second finger moving closer to each other; and (B) Executing processing based on the first identifier and the second identifier that are read out, with use of the fifth wireless communication unit.

In the information processing system, the information processing unit, and the information processing method according to the first embodiment of the technology, processing is carried out on the basis of a combination of a plurality of identifiers that are read out from each of a plurality of wireless communication units combined from among the plurality of wireless communication units. Therefore, for example, even if an identifier of a certain wireless communication unit is read out by a reader/writer, another identifier to be combined with the read-out identifier is not read out, which prevents execution of processing based on the read-out identifier.

An information processing system according to a second embodiment of the technology includes: a reader that reads out a first identifier present uniquely in a user's body; one or more first wireless communication units each having a second identifier; and a second wireless communication unit that reads out the second identifier from the one or more first wireless communication units among the one or more first wireless communication units. The information processing system further includes an information processing unit that executes processing based on a combination of the first identifier that is read out by the reader with the one or more second identifiers that are read out by the second wireless communication unit.

An information processing unit according to the second embodiment of the technology includes a database that gives a description of contents of processing in accordance with a combination of a first identifier present uniquely in a user's body with one or more second identifiers assigned one by one to each of one or more wireless communication units. The information processing unit further includes an arithmetic section that reads out a content of processing in accordance with a combination of the inputted first identifier and the one or more inputted second identifiers from the database when the first identifier and one or more second identifiers that are combined are inputted, and executes processing in accordance with the content of processing.

An information processing method according to the second embodiment of the technology is carried out when a first identifier is present uniquely in a user's body, and a fourth wireless communication unit having a second identifier is fixed onto a finger directly or indirectly. The information processing method includes two steps given below:

(A) When the fourth wireless communication unit and a fifth wireless communication unit become able to communicate with each other, and a reader becomes able to read out the first identifier, the fifth wireless communication unit reads out the second identifier, and the reader reads out the first identifier.

(B) An information processing unit coupled to the fifth wireless communication unit and the reader executes processing based on the first identifier and second identifier that are read out.

In the information processing system, the information processing unit, and the information processing method according to the second embodiment of the technology, processing is carried out on the basis of a combination of the first identifier that is read out by the reader with the one or more second identifiers that are read out by the second wireless communication unit. Therefore, for example, even if an identifier of a certain wireless communication unit is read out by a reader/writer, another identifier to be combined with the read-out identifier is not read out, which prevents execution of processing based on the read-out identifier.

Effects of the Invention

According to the information processing system, the information processing unit, and the information processing method of the first embodiment of the technology, processing is carried out on the basis of a combination of the plurality of identifiers that are read out from each of the plurality of wireless communication units combined from among the plurality of wireless communication units, which makes it possible to suppress generation of wireless communication processing against a user's intent. It is to be noted that the effects of the technology are not necessarily limited to the effects described above, and may be any of the effects that will be described herein.

According to the information processing system, the information processing unit, and the information processing method of the second embodiment of the technology, processing is carried out on the basis of a combination of the first identifier that is read out by the reader with the one or more second identifiers that are read out by the second wireless communication unit, which makes it possible to suppress generation of wireless communication processing against a user's intent. It is to be noted that the effects of the technology are not necessarily limited to the effects described above, and may be any of the effects that will be described herein.

BRIEF DESCRIPTION OF DRAWINGS

FIG. 1 is a diagram illustrating an example of a configuration of an information processing system according to an embodiment of the technology.

FIG. 2 is a diagram illustrating an example of a configuration of a wireless communication unit of FIG. 1.

FIG. 3 is a diagram illustrating an example of a configuration of an IC chip of FIG. 2.

FIG. 4 is a diagram illustrating an example of a configuration of an information processing unit of FIG. 1.

FIG. 5 illustrates an example of a database of FIG. 1.

FIG. 6 is a schematic view of an example of placement of the wireless communication unit of FIG. 1.

FIG. 7 illustrates an example of information processing procedures in the information processing system of FIG. 1.

FIG. 8 is a schematic view of an example illustrating how two fingers are moved closer to each other.

FIG. 9 is a schematic view of another example of the placement of the wireless communication unit of FIG. 1.

FIG. 10 illustrates another example of the database of FIG. 1.

FIG. 11 is a diagram illustrating a modification example of a configuration of the information processing system of FIG. 1.

FIG. 12 illustrates an example of a database to be used in the information processing system of FIG. 11.

FIG. 13 illustrates an example of information processing procedures in the information processing system of FIG. 11.

FIG. 14 illustrates another example of the database to be used in the information processing system of FIG. 11.

DETAILED DESCRIPTION

Hereinafter, embodiments of the technology are described in detail with reference to the drawings. It is to be noted that the description is given in the following order.
1. Embodiments
2. Modification Examples

1. EMBODIMENTS

[Configuration]
First, the description is provided on an information processing system 1 according to an embodiment of the technology. It is to be noted that the information processing system 1 corresponds to a specific example of an "information processing system" of the technology. FIG. 1 illustrates an example of a configuration of the information processing system 1. The information processing system 1 serves to perform, for example, processing of electronic money settlement, processing of access control, processing of GPS-based positional measurement, etc. with use of a wireless communication unit with a built-in RFID circuit (for example, an RFID tag, etc.). The information processing system 1 includes, for example, a plurality of wireless communication units 2 each of which has an identifier 22B-1 (to be described later), a reader/writer 3, an information processing unit 4, and a display unit 5. The wireless communication unit 2 corresponds to a specific example of a "first wireless communication unit" of the technology. The reader/writer 3 corresponds to a specific example of a "second wireless communication unit" of the technology. The information processing unit 4 corresponds to a specific example of an "information processing unit" of the technology.

(Wireless Communication Unit 2)
FIG. 2 illustrates an example of a configuration of the wireless communication unit 2. Each of the wireless communication units 2 has an antenna 21 and an IC chip 22, as illustrated in FIG. 2, for example. The antenna 21 corresponds to a specific example of an "antenna" of the technology. The IC chip 22 corresponds to a specific example of an "IC chip" of the technology. For example, the antenna 21 receives a carrier wave to be transmitted from the reader/writer 3, and generates a potential difference in a waveform depending on a change in a magnetic field of the received carrier wave between the terminals of the antenna 21. The terminals of the antenna 21 are coupled to the IC chip 22.

FIG. 3 illustrates an example of a configuration of the IC chip 22. The IC chip 22 has an RFID circuit 22A that is coupled to the terminals of the antenna 21, and a storage circuit 22B that is coupled to the RFID circuit 22A, as illustrated in FIG. 3, for example. The RFID circuit 22A corresponds to a specific example of an "RFID circuit" of the technology. The storage circuit 22B corresponds to a specific example of a "storage circuit" of the technology.

The RFID circuit 22A serves to transmit/receive each piece of information (for example, address information) between the RFID circuit 22A and a different electronic apparatus (for example, the reader/writer 3) utilizing, for example, near field communication. For example, NFC is usable as such a wireless communication method. Examples of the NFC include FeliCa (registered trademark), Type-A and Type-B that are specified in the international standard ISO (International Organization for Standardization)/IEC (International Electrotechnical Commission) 14443 for non-contact IC (Integrated Circuit) cards, and Type-F that is specified in the ISO/IEC 18092, and the like.

The RFID circuit 22A has, for example, a receiving circuit that performs demodulation to take out signal components at a predetermined frequency from a received carrier wave, a transmitting circuit that performs modulation of a transmission signal, and an arithmetic circuit that performs predetermined processing on the basis of the signal components taken out from the carrier wave. The signal components at a predetermined frequency are signals such as a variety of commands that are superimposed onto the carrier wave by the reader/writer 3. The transmitting circuit superimposes the transmission signal such as the identifier 22B-1 (to be described later) onto a reflected wave of the received carrier wave, for example. The RFID circuit 22A may have, for example, a rectifier circuit that serves to extract a direct-current voltage from the received carrier wave.

The storage circuit 22B stores, for example, the identifier 22B-1, and a variety of data depending on an application (a function) of the wireless communication unit 2. The identifier 22B-1 corresponds to a specific example of an "identifier" of the technology. The storage circuit 22B includes a non-volatile memory, etc., and includes, for example, an EEPROM (Electrically Erasable Programmable Read-Only Memory), a flash memory, a resistive random access memory, etc. The identifier 22B-1 is a unique identifier assigned to each of the wireless communication units 2. The identifier 22B-1 is, for example, an identifier that causes the information processing unit 4 to execute the application (function) of the assigned wireless communication unit 2.

(Reader/Writer 3)

The reader/writer 3 carries out communication with the plurality of wireless communication units 2 existing in a predetermined communication region CR. The plurality of wireless communication units 2 existing in the predetermined communication region CR are combined by a user from among the plurality of wireless communication units 2. Therefore, the reader/writer 3 performs communication with the plurality of wireless communication units 2 that are combined by the user from among the plurality of wireless communication units 2, thereby reading the identifier 22B-1, etc. from each of the plurality of wireless communication units 2 with which the reader/writer 3 is communicating. The reader/writer 3 outputs externally, for example, a carrier wave onto which signals such as a variety of commands inputted from the information processing unit 4 are superimposed. It is to be noted that a specific method of the "combination of the plurality of wireless communication units 2 by the user" is to be later described in detail.

(Information Processing Unit 4)

The information processing unit 4 executes the application (the function) assigned to each of the wireless communication units 2. The information processing unit 4 transmits, for example, signals such as a variety of commands to the reader/writer 3. Further, the information processing unit 4 executes processing based on a combination of the plurality of identifiers 22B-1 that the reader/writer 3 reads out.

FIG. 4 illustrates an example of a configuration of the information processing unit 4. The information processing unit 4 has, for example, a database 41 and an arithmetic section 42, as illustrated in FIG. 4. The database 41 gives a description of contents of processing in accordance with a combination of the plurality of identifiers 22B-1 that are assigned one by one to each of the plurality of wireless communication units 2. When the plurality of identifiers 22B-1 that are combined are inputted from the reader/writer 3, the arithmetic section 42 reads out the content of processing in accordance with the combination of the plurality of inputted identifiers 22B-1 from the database 41, and executes processing in accordance with the content of processing that are read out.

FIG. 5 represents an example of the database 41. The database 41 assigns the content of processing one by one for each of the combinations of the plurality of identifiers 22B-1. For example, in a case where the combination of the plurality of identifiers 22B-1 is A and B, the content of processing is "processing of electronic money settlement". Further, for example, in a case where the combination of the plurality of identifiers 22B-1 is A and C, the content of processing is "processing of access control". Additionally, for example, in a case where the combination of the plurality of identifiers 22B-1 is A and D, the content of processing is "processing of GPS-based positional measurement". It is to be noted that, in carrying out the GPS-based positional measurement, it is necessary for the wireless communication unit 2 to have a device that performs the GPS-based positional measurement to output positional information to the IC chip 22.

Here, it is assumed that the combination of the plurality of identifiers 22B-1 included in the database 41 typically involves A. In other words, it is assumed that the identifier 22B-1 (a first identifier) that is one of the plurality of identifiers 22B-1 that are read out by the reader/writer 3 typically becomes A. At this time, A serves as a flag meaning permission of execution of the processing corresponding to the one or more identifiers 22B-1 (for example, B, C, and D) other than A among the plurality of identifiers 22B-1 that are read out by the reader/writer 3.

Therefore, the arithmetic section 42 executes the processing corresponding to the one or more identifiers 22B-1 other than the one identifier 22B-1 (the first identifier) among the plurality of identifiers 22B-1 that are read out by the reader/writer 3.

The information processing unit 4 outputs an execution result of the processing. For example, the information processing unit 4 outputs the execution result of the processing to the reader/writer 3, thereby causing the reader/writer 3 to perform writing into the wireless communication unit 2 related to the execution result. Further, for example, the information processing unit 4 outputs the execution result of the processing to the display unit 5, thereby causing the display unit 5 to display the execution result.

(Display Unit 5)

The display unit 5 performs display operation based on an image signal from the information processing unit 4. For example, when the image signal including an execution result is inputted from the information processing unit 4, the display unit 5 displays the execution result on the basis of the image signal that is inputted.

Next, the description is provided on a specific method of the "combination of the plurality of wireless communication units 2 by a user". FIG. 6 illustrates an example of placement of the wireless communication unit 2. Each of the plurality of wireless communication units 2 is directly fixed one by one to all or a portion of a plurality of fingers 100 (specifically, nails 110) of a user. Fixing of each of the wireless communication units 2 to the finger 100 (specifically, the nail 110) is carried out by covering the wireless communication unit 2 with resin 200, as illustrated in FIG. 6, for example. The resin 200 is provided by performing, for example, a thermal-curing or photo-curing treatment of a hardening resin with low light-transmissive property. The resin 200 may be, for example, a gel nail.

It is to be noted that the reader/writer 3, the information processing unit 4, and the display unit 5 may be coupled to a network. In such a case, the information processing unit 4 communicates with the reader/writer 3 and the display unit 5 over the network. Here, for example, the network may be a network that carries out communication utilizing a communication protocol (TCP/IP) in common use on the Internet, or may be a secure network that carries out communication utilizing a communication protocol specific to the network. Examples of the network include the Internet, an intranet, or a local area network. The reader/writer 3, the information processing unit 4, and the display unit 5 may be coupled to the network over a wired LAN (Local Area Network) such as Ethernet (registered trademark), a wireless LAN such as Wi-Fi, or a mobile phone line, etc., for example.

[Operation]

Next, the description is provided on an example of information processing procedures in the information processing system 1. FIG. 7 represents an example of the information processing procedures in the information processing system 1.

First, a user places each of the wireless communication units 2 one by one on a surface of the nail 110 of his/her own finger 100. Next, the user applies the hardening resin with the low light-transmissive property onto the whole surface of the nail 110 including the wireless communication unit 2, and thereafter leads to curing of the hardening resin by performing a thermal-curing or photo-curing treatment thereof. As a result, the wireless communication unit 2 is directly fixed to the nail 110, as illustrated in FIG. 6.

Next, the user selects the two fingers 100 from among the plurality of his/her own fingers 100) (step S101). At this time, the two fingers 100 may be selected from five fingers included in a right hand or a left hand of the user. Alternatively, the two fingers 100 may be one finger selected from five fingers included in the right hand of the user, and one finger selected from five fingers included in the left hand of the user.

The wireless communication unit 2 (a third wireless communication unit) having the identifier 22B-1 (a first identifier) is directly fixed to the one finger 100 (a first finger) of the two fingers 100 selected by the user. Meanwhile, the wireless communication unit 2 (a fourth wireless communication unit) having the identifier 22B-1 (a second identifier) is directly fixed to the other finger 100 (a second finger) of the two fingers 100 selected by the user.

At this time, the finger 100 (the first finger) and the finger 100 (the second finger) are moved closer to each other in such a manner that the user folds back at least one finger 100 of the two fingers 100 (the first finger and the second finger) (step S102, see FIG. 8). It is to be noted that FIG. 8 illustrates how a tip of a thumb and a tip of an index finger are moved closer to each other (or are brought into contact with each other). Further, the user moves the two fingers 100 (the first finger and the second finger) getting closer to each other toward the inside of the communication region CR of the reader/writer 3. As a result, this allows for mutual communication between the wireless communication unit 2 (the third wireless communication unit) and the wireless communication unit 2 (the fourth wireless communication unit), and the reader/writer 3 (a fifth wireless communication unit). At this time, the identifier 22B-1 (the first identifier) and the identifier 22B-1 (the second identifier) are read out by the reader/writer 3 (step S103). The reader/writer 3 outputs readout results of the identifier 22B-1 (the first identifier) and the identifier 22B-1 (the second identifier) to the information processing unit 4. The information processing unit 4 executes processing based on the identifier 22B-1 (the first identifier) and the identifier 22B-1 (the second identifier) that are read by the reader/writer 3 (step S104). Specifically, the information processing unit 4 reads out the content of processing corresponding to combination of the identifier 22B-1 (the first identifier) and the identifier 22B-1 (the second identifier) from the database 41, and executes the processing in accordance with a readout result of the content of processing that are read out.

[Effects]

Next, the description is provided on the effects of the information processing system 1.

In going out, a person may sometimes leave behind a mobile apparatus or an IC card inadvertently at home. In this case, the person is unable to receive a variety of services with use of the wireless communication unit 2 when going out. Further, even if the person goes out without failing to carry the mobile apparatus or the IC card, it is necessary to take out the mobile apparatus or the IC card from a bag, etc. in order to receive a variety of services with use of the wireless communication unit 2.

Here, for example, it is considered to fix the wireless communication unit 2 onto the finger 100. In such a case, it is possible to prevent inadvertent forgetfulness, and further it is unnecessary to take out the mobile apparatus or the IC card from a bag, etc. In such a case, however, there is a possibility that the finger 100 will enter a communication region of the reader/writer, resulting in execution of wireless communication processing against the user's intent. Further, a similar issue is likely to occur also in the mobile apparatus or the IC card.

In contrast, in the present embodiment, the processing is carried out on the basis of a combination of the plurality of identifiers 22B-1 that are read out from each of the plurality of wireless communication units 2 combined from among the plurality of wireless communication units 2. Therefore, for example, even if the identifier 22B-1 of a certain wireless communication unit 2 is read out by the reader/writer 3, the other identifier 22B-1 (for example, A) to be combined with the read-out identifier 22B-1 (for example, B) is not read out, which prevents execution of processing based on the read-out identifier 22B-1 (for example, B). As a result, this makes it possible to suppress generation of the wireless communication processing against the user's intent.

Further, in the present embodiment, the one identifier 22B-1 of the plurality of identifiers 22B-1 that are read out by the reader/writer 3 becomes a flag meaning permission of execution of the processing corresponding to the remaining one or more identifiers 22B-1 (for example, B, C. and D) among the plurality of identifiers 22B-1 that are read out by the reader/writer 3. As a result, in a case where the above-described flag is not present in the one or more identifiers 22B-1 that are read out by the reader/writer 3, or the reader/writer 3 reads out only the above-described flag, it is possible to suppress generation of the wireless communication processing against the user's intent.

In addition, in the present embodiment, the RFID system is in use for each of the wireless communication units 2. This makes it possible to fix the wireless communication unit 2 onto a small surface such as the nail 110. Therefore, it is possible to enhance the user convenience as compared with a case where the wireless communication unit 2 is fixed onto gloves or a finger cot. Further, in a case where the wireless communication unit 2 is fixed onto the gloves or the finger cot, the gloves or the finger cot may be sometimes left behind at home inadvertently. However, in a case where the wireless communication unit 2 is fixed directly onto the nail 110, etc., it is possible to prevent inadvertent forgetfulness.

Moreover, in the present embodiment, the information processing unit 4 outputs an execution result of the processing. Therefore, in a case where the information processing unit 4 outputs the execution result of the processing on the display unit 5, a user is able to easily confirm that predetermined processing is surely completed. Further, in a case where the information processing unit 4 outputs the execution result of the processing to the reader/writer 3, thereby causing the reader/writer 3 to perform writing into the wireless communication unit 2 related to the execution result, it is possible to execute the complicated application (function) such as rewriting of the content of the wireless communication unit 2.

2. MODIFICATION EXAMPLES

Modification Example A

FIG. 9 illustrates another example of the placement of the wireless communication unit 2. In FIG. 9, the wireless communication unit 2 is fixed onto a surface of an artificial nail 300 instead of the nail 110. At this time, the wireless communication unit 2 is fixed indirectly onto the finger 100. Even in such a case, it is also possible to suppress generation of the wireless communication processing against the user's intent, as with the above-described embodiment.

Modification Example B

In the above-described embodiment and modification example A, a case is exemplified where the content of processing is assigned one by one for each of combinations of the two identifiers 22B-1 in the database 41. However, in the above-described embodiment and modification example A, the content of processing may be assigned one by one for each of combinations of the three or more identifiers 22B-1. In this case, the plurality of identifiers 22B-1 among the three or more combined identifiers 22B-1 become flags meaning permission of execution of the processing corresponding to the remaining one or more identifiers 22B-1.

For example, in the database 41, the content of processing may be assigned one by one for each of combinations of the three identifiers 22B-1. In this case, the two identifiers 22B-1 among the three combined identifiers 22B-1 become flags meaning permission of execution of the processing corresponding to the remaining one identifier 22B-1. Further, in such a case, for example, in a state where the wireless communication unit 2 is fixed onto each of surfaces of a thumbnail, a nail of an index finger, and a nail of a little finger, by moving a tip of the thumb, a tip of the index finger, and a tip of the little finger closer to one another (or by bringing them into contact with one another) to move them toward the inside of the communication region CR of the reader/writer 3, the predetermined is executed.

FIG. 10 represents an example of the database 41 of the present modification example. In the database 41 represented in FIG. 10, the content of processing is assigned one by one for each of combinations of the three identifiers 22B-1. For example, in a case where the combination of the plurality of identifiers 22B-1 is A, B. and C, the content of processing is a "processing of electronic money settlement". Further, for example, in a case where the combination of the plurality of identifiers 22B-1 is A, B, and D, the content of processing is a "processing of access control". Additionally, for example, in a case where the combination of the plurality of identifiers 22B-1 is A, B, and E, the content of processing is a "processing of GPS-based positional measurement".

Here, it is assumed that the combination of the plurality of identifiers 22B-1 included in the database 41 typically involves A and B. In other words, it is assumed that the two identifiers 22B-1 (the first identifiers) among the plurality of identifiers 22B-1 that are read out by the reader/writer 3 typically become A and B. At this time, A and B become flags meaning permission of execution of the processing corresponding to the identifiers 22B-1 (for example, C, D, and E) other than A and B among the plurality of identifiers 22B-1 that are read out by the reader/writer 3.

Therefore, the arithmetic section 42 executes the processing corresponding to the one or more identifiers 22B-1 other than the plurality of identifiers 22B-1 (the first identifiers) equivalent to the flags among the three or more identifiers 22B-1 that are read out by the reader/writer 3. Even in such a case, it is also possible to suppress generation of the wireless communication processing against the user's intent, as with the above-described embodiment.

Modification Example C

In the above-described embodiment, and modification examples A and B, the contents of processing that are described in the database 41 include the processing of the electronic money settlement, the processing of the access control, and the processing of the GPS-based positional measurement; however, processing other than those may be included. For example, in the above-described embodiment, and modification examples A and B, the contents of processing that are described in the database 41 may include, for example, processing of information acquisition during an event, processing of biological information such as body temperature, processing of asset management, processing of equipment-lending management, processing of emergency notification, processing of personal identification, etc. It is to be noted that, in carrying out the processing of the biological information such as body temperature, it is necessary for the wireless communication unit 2 to have a device that acquires the biological information such as the body temperature to output such information to the IC chip 22.

Modification Example D

In the above-described embodiment, and modification examples A to C, the information processing system 1 carries out the predetermined processing on the basis of the combination of the plurality of identifiers 22B-1 that are read out from the plurality of wireless communication units 2. However, in the above-described embodiment, and modification examples A to C, the information processing system 1 may carry out the predetermined processing on the basis of the combination of the one or more identifiers 22B-1 that are read out from the one or more wireless communication units 2 with an identifier present uniquely in a user's body.

FIG. 11 illustrates an example of a configuration of an information processing system 6 according to the present modification example. The information processing system 6 serves to perform, for example, processing of credit card settlement, processing of electronic money settlement, etc. with use of a wireless communication unit with a built-in RFID circuit (for example, an RFID tag, etc.), and a mobile terminal such as a smartphone. The information processing system 6 includes, for example, a plurality of wireless communication units 2 each of which has an identifier 22B-1, a reader/writer 3, an information processing unit 4, a display unit 5, and a mobile terminal 8.

At least the information processing unit 4 among the reader/writer 3, the information processing unit 4, and the display unit 5 is coupled to a communication network 7. The mobile terminal 8 is also coupled to the communication network 7. For example, the communication network 7 may be, for example, a network that carries out communication utilizing a communication protocol (TCP/IP) in common use on the Internet, or may be a secure network that carries out communication utilizing a communication protocol specific to the network. Examples of the communication network 7 include the Internet, an intranet, or a local area network. At least the information processing unit 4 between the information processing unit 4 and the display unit 5, and the mobile terminal 8 may be coupled to the network over a wired LAN such as Ethernet, a wireless LAN such as Wi-Fi, or a mobile phone line, etc. for example.

The mobile terminal 8 is, for example, a smartphone, and is prepared by a user. For example, application software for the credit card settlement or electronic money settlement is installed on the mobile terminal 8. In this application software, for example, a first identifier (for example, an identifier (the user's fingerprint) present uniquely in the user's body), and a second identifier (for example, card information, prepayment information, etc.) are registered. The data registered in the application software is stored in the information processing unit 4.

FIG. 12 represents an example of the database 41 according to the present modification example. In the database 41, the content of processing is assigned one by one for each of the combinations of the identifier (the user's fingerprint) present uniquely in the user's body, and one or more identifiers assigned one by one to each of one or more wireless communication units. For example, in a case where two identifiers that are read out by the reader/writer 3 are X and α, the content of processing is a "processing of credit settlement". Further, for example, in a case where the two identifiers that are read out by the reader/writer 3 are X and β, the content of processing is a "processing of electronic money settlement". It is to be noted that the above X is data corresponding to the first identifier, and is, for example, the data on the identifier (the user's fingerprint) present uniquely in the user's body. Further, the above α is data corresponding to the second identifier, and is, for example, card information. In addition, the above β is data corresponding to the second identifier, and is, for example, prepayment information. It is to be noted that, in order to read a fingerprint by the reader/writer 3, it is necessary for the reader/writer 3 to include a function of reading the identifier (the user's fingerprint) present uniquely in the user's body. In other words, in the present modification example, the reader/writer 3 includes the function of reading the identifier (the user's fingerprint) present uniquely in the user's body.

Here, it is assumed that the combination of the plurality of identifiers included in the database 41 typically involves X. In other words, it is assumed that one of the plurality of identifiers that are read out by the reader/writer 3 typically becomes X. At this time, X becomes a flag meaning permission of execution of the processing corresponding to the one or more identifiers (for example, α and β) other than X among the plurality of identifiers that are read out by the reader/writer 3.

Therefore, the arithmetic section 42 executes the processing corresponding to the one or more identifiers (the second identifiers) other than the one identifier (the first identifier) among the plurality of identifiers that are read out by the reader/writer 3.

Next, the description is provided on an example of information processing procedures in the information processing system 6. FIG. 13 represents an example of the information processing procedures in the information processing system 6.

First, a user places each of the plurality of wireless communication units 2 one by one on a surface of the nail 110 of his/her own finger 100. Next, the user applies the hardening resin with the low light-transmissive property onto the whole surface of the nail 110 including the wireless communication unit 2, and thereafter leads to curing of the hardening resin by performing a thermal-curing or photocuring treatment thereof. As a result, the wireless communication unit 2 is directly fixed to the nail 110, as illustrated in FIG. 6.

Next, the user installs application software for the credit card settlement or electronic money settlement on the mobile terminal 8. Thereafter, the user registers the first identifier (the identifier (the user's fingerprint) present uniquely in the user's body), and the second identifier (for example, the card information, prepayment information, etc.) on the installed application software. Afterwards, the first identifier (the identifier (the user's fingerprint) present uniquely in the user's body), and the second identifier (for example, the card information, prepayment information, etc.) are stored in the information processing unit 4.

Next, the user selects the one finger 100 from among the plurality of his/her own fingers 100 (step S201). At this time, the one finger 100 may be selected from five fingers included in a right hand or a left hand of the user. The wireless communication unit 2 having the identifier 22B-1 (for example, the card information, prepayment information, etc.) is directly fixed to the one finger 100 selected by the user. Meanwhile, the identifier (the identifier (the user's fingerprint) present uniquely in the user's body) that is registered on the application software is present on a tip of the one finger 100 selected by the user.

At this time, the user puts the selected finger 100 on a predetermined position (step S202). Specifically, the user moves the selected finger 100 into the communication region CR of the reader/writer 3, and puts the selected finger 100 on a position that is provided with a function of reading the identifier (the user's fingerprint) present uniquely in the user's body in the reader/writer 3. As a result, this allows for mutual communication between the wireless communication unit 2 fixed to the selected finger 100 and the reader/writer 3. At this time, the second identifier (for example, the card information, prepayment information, etc.) and the first identifier (the identifier (the user's fingerprint) present uniquely in the user's body) are read out by the reader/writer 3 (step S203). The reader/writer 3 outputs readout results of the second identifier (for example, the card information, prepayment information, etc.) and the first identifier (the identifier (the user's fingerprint) present uniquely in the user's body) to the information processing unit 4. The information processing unit 4 executes processing based on the second identifier (for example, the card information, prepayment information, etc.) and the first identifier (the identifier (the user's fingerprint) present uniquely in the user's body) that are read by the reader/writer 3 (step S204). Specifically, the information processing unit 4 reads out the content of processing corresponding to combination of the second identifier (for example, the card information, prepayment information, etc.) and the first identifier (the identifier (the user's fingerprint) present uniquely in the user's body), and executes the processing in accordance with a readout result of the content of processing.

In the present modification example, the predetermined processing is carried out on the basis of a combination of the one or more identifiers 22B-1 that are read out from the one or more wireless communication units 2 with the other identifier. Therefore, for example, even if the identifier 22B-1 of a certain wireless communication unit 2 is read out by the reader/writer 3, the other identifier 22B-1 to be combined with the read-out identifier 22B-1 is not read out, which prevents execution of processing based on the read-out identifier 22B-1. As a result, this makes it possible to suppress generation of the wireless communication processing against the user's intent.

Further, in the present modification example, each of the wireless communication units 2 uses the RFID system, and the first identifier uses the identifier (the user's fingerprint) present uniquely in the user's body. This makes it possible to prevent inadvertent forgetfulness. In addition, this eliminates the necessity for taking out a terminal from a bag, etc., and facilitates complicated combinations of the identifiers as well. Moreover, this leads to enhancement of the security.

It is to be noted that, also in the present modification example, the content of processing may be assigned one by one for each of combinations of three identifiers in the database 41, as illustrated in an example in FIG. 14. For example, in a case where the combination of the plurality of identifiers is X, Y, and α, the content of processing is a "processing of credit settlement". Further, for example, in a case where the combination of the plurality of identifiers is X, Y, and β, the content of processing is a "processing of electronic money settlement".

Here, it is assumed that the combination of the plurality of identifiers included in the database 41 typically involves X and Y. In other words, it is assumed that two of the plurality of identifiers 22B-1 that are read out by the reader/writer 3 typically become X and Y. At this time, X and Y become flags meaning permission of execution of the processing corresponding to the identifiers other than X and Y among the plurality of identifiers that are read out by the reader/writer 3.

Therefore, the arithmetic section 42 executes the processing corresponding to the one or more identifiers other than the plurality of identifiers equivalent to the flags among the three or more identities that are read out by the reader/writer 3. Even in such a case, it is also possible to suppress generation of the wireless communication processing against the user's intent, as with the above-described embodiment.

The technology is described thus far with reference to the plurality of embodiments, and the modification examples thereof; however, the technology is not limited to the above-described embodiments, etc., but various modifications may be made. It is to be noted that the effects described herein are merely exemplified. The effects of the technology are not limited to the effects described herein. The technology may have effects other than the effects described herein.

Further, for example, the technology may be configured as follows.

(1)

An information processing system including:

a plurality of first wireless communication units each having an identifier;

a second wireless communication unit that reads out the identifier from each of a plurality of first wireless communication units which are combined from among the plurality of first wireless communication units; and an information processing unit that executes processing based on a combination of the plurality of identifiers that are read out by the second wireless communication unit.

(2)

The information processing system according to (1), in which, in a case where a first identifier that is one of the plurality of identifiers that are read out by the second wireless communication unit is a flag meaning permission of execution of processing corresponding to one or more identifiers other than the first identifier among the plurality of identifiers that are read out by the second wireless communication unit, the information processing unit executes processing corresponding to the one or more identifiers other than the first identifier among the plurality of identifiers that are read out by the second wireless communication unit.

(3)

The information processing unit according to (1) or (2), in which each of the first wireless communication units has:

an IC (Integrated Circuit) chip incorporating an RFID (Radio Frequency Identification) circuit and a storage circuit that stores the identifier; and an antenna coupled to the IC chip.

(4)

The information processing system according to any one of (1) to (3), in which the plurality of first wireless communication units are each fixed one by one onto all or a portion of a plurality of user's fingers directly or indirectly.

(5)

The information processing system according to any one of (1) to (4), in which the information processing unit outputs an execution result of the processing.

(6)

An information processing system including:

a reader that reads out a first identifier present uniquely in a user's body;

one or more first wireless communication units each having a second identifier;

a second wireless communication unit that reads out the second identifier from one or more first wireless communication units among the one or more first wireless communication units; and an information processing unit that executes processing based on a combination of the first identifier that is read out by the reader with one or more second identifiers that are read out by the second wireless communication unit.

(7)

The information processing system according to (6), in which, in a case where the first identifier that is read out by the reader is a flag meaning permission of execution of processing corresponding to the one or more second identifiers that are read out by the second wireless communication unit, the information processing unit executes processing corresponding to the one or more second identifiers that are read out by the second wireless communication unit.

(8)

The information processing unit according to (6) or (7), in which each of the first wireless communication units has:

an IC (Integrated Circuit) chip incorporating an RFID (Radio Frequency Identification) circuit and a storage circuit that stores the identifier; and an antenna coupled to the IC chip.

(9)

The information processing system according to any one of (6) to (8), in which the plurality of first wireless communication units are each fixed one by one onto all or a portion of a plurality of user's fingers directly or indirectly.

(10)

The information processing system according to any one of (1) to (9), in which the information processing unit outputs an execution result of the processing.

(11)

An information processing unit including:

a database that gives a description of a content of processing in accordance with a combination of a plurality of identifiers assigned one by one to each of a plurality of wireless communication units; and an arithmetic section that, when the plurality of identifiers that are combined are inputted, reads out, from the database, the content of processing in accordance with a combination of the plurality of identifiers that are inputted, and executes processing in accordance with the content of processing.

(12)

An information processing unit including:

a database that gives a description of a content of processing in accordance with a combination of a first identifier present uniquely in a user's body with one or more second identifiers assigned one by one to each of one or more wireless communication units; and an arithmetic section that, when the first identifier and one or more second identifiers that are combined are inputted, reads out, from the database, the content of processing in accordance with a combination of the first identifier and the one or more inputted second identifiers that are inputted, and executes processing in accordance with the content of processing.

(13)

An information processing method, the method including:

in a case where a third wireless communication unit having a first identifier is fixed onto a first finger directly or indirectly, and a fourth wireless communication unit having a second identifier is fixed onto a second finger directly or indirectly, and when the third wireless communication unit and the fourth wireless communication unit, and a fifth wireless communication unit become able to communicate with each other as a result of the first finger and the second finger moving closer to each other, the fifth wireless communication unit reading out the first identifier and the second identifier; and an information processing unit coupled to the fifth wireless communication unit executing processing based on the first identifier and the second identifier that are read out.

(14)

An information processing method, the method including:

in a case where a first identifier is present uniquely in a user's body, and a fourth wireless communication unit having a second identifier is fixed onto a finger directly or indirectly, and when the fourth wireless communication unit and a fifth wireless communication unit become able to communicate with each other, and a reader becomes able to read out the first identifier, the fifth wireless communication unit reading out the second identifier, and the reader reading out the first identifier; and an information processing unit coupled to the fifth wireless communication unit and the reader executes processing based on the first identifier and the second identifier that are read out.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An information processing system comprising:

a plurality of first wireless communication units each having an identifier, wherein each of the plurality of first wireless communication units is fixed to a user's hand directly or indirectly;

a second wireless communication unit that is not fixed to the user's hand directly or indirectly, wherein the second wireless communication unit that outputs a signal to a predetermined communication region that surrounds at least part of the second wireless communication unit, and each of the plurality of first wireless communication units is either within the communication region or outside the communication region, such that a first subset of the first wireless communication units is inside the communication region and a second subset of the first wireless communication units is outside the communication region, and the first subset includes a third subset of at least one of the first wireless communication units and a fourth subset of at least one of the first wireless communication units, wherein the second wireless communication unit reads out the identifier only from each of the first subset of the first wireless communication units, including reading out respective identifiers from each of the first wireless communication units in both the third subset and the fourth subset which are combined with each other; and an information processing unit that executes processing based on a combination of the plurality of identifiers from the third and fourth subsets of the first wireless communication units that are read out by the second wireless communication unit.

2. The information processing system according to claim 1, wherein, in a case where a first identifier that is one of the plurality of identifiers that are read out by the second wireless communication unit is a flag meaning permission of execution of processing corresponding to one or more identifiers other than the first identifier among the plurality of identifiers that are read out by the second wireless communication unit, the information processing unit executes processing corresponding to the one or more identifiers other than the first identifier among the plurality of identifiers that are read out by the second wireless communication unit.

3. The information processing system according to claim 1, wherein
each of the first wireless communication units has:
an IC (Integrated Circuit) chip incorporating an RFID (Radio Frequency Identification) circuit and a storage circuit that stores the identifier; and
an antenna coupled to the IC chip.

4. The information processing system according to claim 1, wherein the plurality of first wireless communication units are each fixed one by one onto all or a portion of a plurality of user's fingers directly or indirectly.

5. The information processing system according to claim 1, wherein the information processing unit outputs an execution result of the processing.

6. The information processing system according to claim 1, wherein the plurality of first wireless communication units includes at least three first wireless communication units.

7. The information processing system according to claim 6, wherein the first subset of the first wireless communication units includes a range of two to five first wireless communication units.

8. The information processing system according to claim 6, wherein the first subset of the first wireless communication units includes three first wireless communication units.

9. The information processing system according to claim 8, wherein the second subset of the first wireless communication units includes at least one first wireless communication unit.

10. The information processing system according to claim 1, wherein the signal output by the second wireless communication unit includes a carrier wave.

11. The information processing system according to claim 1, wherein each of the plurality of first wireless communication units is fixed to the user's hand indirectly by a glove.

12. An information processing system comprising:
a reader that reads out a first identifier present uniquely in a user's body;
one or more first wireless communication units each having a second identifier, wherein each of the one or more first wireless communication units is fixed to a user's hand directly or indirectly;
a second wireless communication unit that is not fixed to the user's hand directly or indirectly, wherein the second wireless communication unit that outputs a signal to a predetermined communication region that surrounds at least part of the second wireless communication unit, and each of the one or more first wireless communication units is either within the communication region or outside the communication region, such that a first subset of the one or more first wireless communication units is inside the communication region and a second subset of the one or more first wireless communication units is outside the communication region, and the first subset includes a third subset of at least one of the first wireless communication units and a fourth subset of at least one of the first wireless communication units, wherein the second wireless communication unit reads out only the second identifier from each of the first subset of the one or more first wireless communication units including reading out respective identifiers from each of the first wireless communication units in both the third subset and the fourth subset which are combined with each other; and
an information processing unit that executes processing based on a combination of the first identifier that is read out by the reader with one or more second identifiers from the third and fourth subsets that are read out by the second wireless communication unit from the first subset of the one or more first wireless communication units.

13. The information processing system according to claim 12, wherein in a case where the first identifier that is read out by the reader is a flag meaning permission of execution of processing corresponding to the one or more second identifiers that are read out by the second wireless communication unit, the information processing unit executes processing corresponding to the one or more second identifiers that are read out by the second wireless communication unit.

14. The information processing system according to claim 12, wherein
each of the first wireless communication units has:
an IC (Integrated Circuit) chip incorporating an RFID (Radio Frequency Identification) circuit and a storage circuit that stores the identifier; and
an antenna coupled to the IC chip.

15. The information processing system according to claim 12, wherein the plurality of first wireless communication units are each fixed one by one onto all or a portion of a plurality of user's fingers directly or indirectly.

16. The information processing system according to claim 12, wherein the information processing unit outputs an execution result of the processing.

17. An information processing unit comprising:
a database, wherein a plurality of first wireless communication units, each fixed to a user's hand directly or indirectly, each have an identifier and a second wireless communication unit that is not fixed to the user's hand directly or indirectly outputs a signal to a predetermined communication region that surrounds at least part of the second wireless communication unit, and each of the plurality of first wireless communication units is either within the communication region or outside the communication region, such that a first subset of the first wireless communication units is inside the communication region and a second subset of the first wireless communication units is outside the communication region, and the first subset includes a third subset of at least one of the first wireless communication units and a fourth subset of at least one of the first wireless communication units, and wherein the database gives a description of a content of processing in accordance with a combination of only a plurality of identifiers assigned one by one to each of the third and fourth subsets of the first wireless communication units; and
an arithmetic section that, when the plurality of identifiers from the third and fourth subsets that are combined are inputted, reads out, from the database, the content of processing in accordance with a combination of the plurality of identifiers from the third and fourth subsets that are inputted, and executes processing in accordance with the content of processing.

18. An information processing unit comprising:
a database, wherein one or more wireless communication units each have an identifier and each of the one or more first wireless communication units is fixed to a user's hand directly or indirectly, and a second wireless communication unit that is not fixed to the user's hand directly or indirectly outputs a signal to a predetermined communication region that surrounds at least part of the second wireless communication unit, and each of the one or more wireless communication units is either within the communication region or outside the communication region, such that a first subset of the one or more wireless communication units is inside the communication region and a second subset of the one or more wireless communication units is outside the communication region, and the first subset includes a third subset of at least one of the first wireless communication units and a fourth subset of at least one of the first wireless communication units, and wherein the database gives a description of a content of processing in accordance with a combination of a first identifier present uniquely in a user's body with only one or more second identifiers assigned one by one to each of the first third and fourth subsets of the one or more wireless communication units within the communication region; and an arithmetic section that, when the first identifier and one or more second identifiers from the third and fourth subsets that are combined are inputted, reads out, from the database, the content of processing in accordance with a combination of the first identifier and the one or more inputted second identifiers from the third and fourth subsets that are inputted, and executes processing in accordance with the content of processing.

\* \* \* \* \*